US012474859B2

(12) United States Patent
Shibayama

(10) Patent No.: US 12,474,859 B2
(45) Date of Patent: Nov. 18, 2025

(54) DIGITAL FILTER DEVICE, OPERATION METHOD FOR DIGITAL FILTER DEVICE, AND NON-TRANSITORY COMPUTER-READABLE MEDIUM STORING PROGRAM

(71) Applicant: NEC Corporation, Tokyo (JP)

(72) Inventor: Atsufumi Shibayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1099 days.

(21) Appl. No.: 17/439,902

(22) PCT Filed: Feb. 10, 2020

(86) PCT No.: PCT/JP2020/005018
§ 371 (c)(1),
(2) Date: Sep. 16, 2021

(87) PCT Pub. No.: WO2020/195239
PCT Pub. Date: Oct. 1, 2020

(65) Prior Publication Data
US 2022/0188014 A1    Jun. 16, 2022

(30) Foreign Application Priority Data
Mar. 26, 2019  (JP) .................. 2019-058457

(51) Int. Cl.
*G06F 3/06*  (2006.01)
(52) U.S. Cl.
CPC .......... *G06F 3/0655* (2013.01); *G06F 3/0604* (2013.01); *G06F 3/0679* (2013.01)
(58) Field of Classification Search
CPC .... G06F 3/0655; G06F 3/0604; G06F 3/0679; G06F 17/14
See application file for complete search history.

(56) References Cited

U.S. PATENT DOCUMENTS

| | | | |
|---|---|---|---|
| 2010/0106944 A1* | 4/2010 | Symes | G06F 9/382 |
| | | | 712/E9.028 |
| 2015/0363360 A1 | 12/2015 | Shibayama et al. | |
| 2020/0372095 A1 | 11/2020 | Shibayama | |

FOREIGN PATENT DOCUMENTS

| | | | |
|---|---|---|---|
| JP | H08-137832 A | 5/1996 | |
| JP | 2001-56806 A | 2/2001 | |

(Continued)

OTHER PUBLICATIONS

International Search Report for PCT Application No. PCT/JP2020/005018, mailed on May 12, 2020.

(Continued)

*Primary Examiner* — Michael D. Yaary
(74) *Attorney, Agent, or Firm* — Sughrue Mion, PLLC

(57) ABSTRACT

A digital filter device including a data rearrangement processing unit (200) configured to rearrange a plurality of pieces of data input in a first order into a second order, wherein the data rearrangement processing unit (200) includes at least a storage means, the data rearrangement processing unit (200) performs writing of data into the storage means according to a first or second address order, and the data rearrangement processing unit (200) performs data rearrangement processing by performing reading from the storage means according to the second address order for data for which writing is performed in the storage means according to the first address order, and performing reading from the storage means according to the first address order for data for which writing is performed in the storage means according to the second address order.

6 Claims, 8 Drawing Sheets

(56) References Cited

FOREIGN PATENT DOCUMENTS

| | | |
|---|---|---|
| JP | 2012-22500 A | 2/2012 |
| WO | 2014/115540 A1 | 7/2014 |
| WO | 2019/031418 A1 | 2/2019 |

OTHER PUBLICATIONS

J.W.Cooley et al., "An Algorithm for the Machine Calculation of Complex Fourier Series", Mathematics of Computation, US, American Mathematical Society, Apr. 1965, vol. 19, No. 90, pp. 297-301.
D.P.Kolba et al., "A Prime Factor FFT Algorithm Using High-Speed Convolution", IEEE Trans. on Acoustics, US, IEEE Signal Processing Society, Aug. 1977, vol. 29, No. 4, pp. 281-294.

\* cited by examiner

Fig. 3

| | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 |
|---|---|---|---|---|---|---|---|---|---|---|---|---|---|---|---|---|---|---|---|---|---|---|---|---|
| in0 | 0a | 8a | 16a | 24a | 32a | 40a | 48a | 56a | 0b | 8b | 16b | 24b | 32b | 40b | 48b | 56b | 0c | 8c | 16c | 24c | 32c | 40c | 48c | 56c |
| in1 | 1a | 9a | 17a | 25a | 33a | 41a | 49a | 57a | 1b | 9b | 17b | 25b | 33b | 41b | 49b | 57b | 1c | 9c | 17c | 25c | 33c | 41c | 49c | 57c |
| in2 | 2a | 10a | 18a | 26a | 34a | 42a | 50a | 58a | 2b | 10b | 18b | 26b | 34b | 42b | 50b | 58b | 2c | 10c | 18c | 26c | 34c | 42c | 50c | 58c |
| in3 | 3a | 11a | 19a | 27a | 35a | 43a | 51a | 59a | 3b | 11b | 19b | 27b | 35b | 43b | 51b | 59b | 3c | 11c | 19c | 27c | 35c | 43c | 51c | 59c |
| in4 | 4a | 12a | 20a | 28a | 36a | 44a | 52a | 60a | 4b | 12b | 20b | 28b | 36b | 44b | 52b | 60b | 4c | 12c | 20c | 28c | 36c | 44c | 52c | 60c |
| in5 | 5a | 13a | 21a | 29a | 37a | 45a | 53a | 61a | 5b | 13b | 21b | 29b | 37b | 45b | 53b | 61b | 5c | 13c | 21c | 29c | 37c | 45c | 53c | 61c |
| in6 | 6a | 14a | 22a | 30a | 38a | 46a | 54a | 62a | 6b | 14b | 22b | 30b | 38b | 46b | 54b | 62b | 6c | 14c | 22c | 30c | 38c | 46c | 54c | 62c |
| in7 | 7a | 15a | 23a | 31a | 39a | 47a | 55a | 63a | 7b | 15b | 23b | 31b | 39b | 47b | 55b | 63b | 7c | 15c | 23c | 31c | 39c | 47c | 55c | 63c |
| 205a | 0a | 15a | 22a | 29a | 36a | 43a | 50a | 57a | 0b | 15b | 22b | 29b | 36b | 43b | 50b | 57b | 0c | 15c | 22c | 29c | 36c | 43c | 50c | 57c |
| 205b | 1a | 8a | 23a | 30a | 37a | 44a | 51a | 58a | 1b | 8b | 23b | 30b | 37b | 44b | 51b | 58b | 1c | 8c | 23c | 30c | 37c | 44c | 51c | 58c |
| 205c | 2a | 9a | 16a | 31a | 38a | 45a | 52a | 59a | 2b | 9b | 16b | 31b | 38b | 45b | 52b | 59b | 2c | 9c | 16c | 31c | 38c | 45c | 52c | 59c |
| 205d | 3a | 10a | 17a | 24a | 39a | 46a | 53a | 60a | 3b | 10b | 17b | 24b | 39b | 46b | 53b | 60b | 3c | 10c | 17c | 24c | 39c | 46c | 53c | 60c |
| 205e | 4a | 11a | 18a | 25a | 32a | 47a | 54a | 61a | 4b | 11b | 18b | 25b | 32b | 47b | 54b | 61b | 4c | 11c | 18c | 25c | 32c | 47c | 54c | 61c |
| 205f | 5a | 12a | 19a | 26a | 33a | 40a | 55a | 62a | 5b | 12b | 19b | 26b | 33b | 40b | 55b | 62b | 5c | 12c | 19c | 26c | 33c | 40c | 55c | 62c |
| 205g | 6a | 13a | 20a | 27a | 34a | 41a | 48a | 63a | 6b | 13b | 20b | 27b | 34b | 41b | 48b | 63b | 6c | 13c | 20c | 27c | 34c | 41c | 48c | 63c |
| 205h | 7a | 14a | 21a | 28a | 35a | 42a | 49a | 56a | 7b | 14b | 21b | 28b | 35b | 42b | 49b | 56b | 7c | 14c | 21c | 28c | 35c | 42c | 49c | 56c |
| 201 | OPERATION MODE 0 | | | | | | | | OPERATION MODE 1 | | | | | | | | OPERATION MODE 0 | | | | | | | |
| 207a | 0 | 7 | 6 | 5 | 4 | 3 | 2 | 1 | 0 | 1 | 2 | 3 | 4 | 5 | 6 | 7 | 0 | 7 | 6 | 5 | 4 | 3 | 2 | 1 |
| 207b | 1 | 0 | 7 | 6 | 5 | 4 | 3 | 2 | 0 | 1 | 2 | 3 | 4 | 5 | 6 | 7 | 1 | 0 | 7 | 6 | 5 | 4 | 3 | 2 |
| 207c | 2 | 1 | 0 | 7 | 6 | 5 | 4 | 3 | 0 | 1 | 2 | 3 | 4 | 5 | 6 | 7 | 2 | 1 | 0 | 7 | 6 | 5 | 4 | 3 |
| 207d | 3 | 2 | 1 | 0 | 7 | 6 | 5 | 4 | 0 | 1 | 2 | 3 | 4 | 5 | 6 | 7 | 3 | 2 | 1 | 0 | 7 | 6 | 5 | 4 |
| 207e | 4 | 3 | 2 | 1 | 0 | 7 | 6 | 5 | 0 | 1 | 2 | 3 | 4 | 5 | 6 | 7 | 4 | 3 | 2 | 1 | 0 | 7 | 6 | 5 |
| 207f | 5 | 4 | 3 | 2 | 1 | 0 | 7 | 6 | 0 | 1 | 2 | 3 | 4 | 5 | 6 | 7 | 5 | 4 | 3 | 2 | 1 | 0 | 7 | 6 |
| 207g | 6 | 5 | 4 | 3 | 2 | 1 | 0 | 7 | 0 | 1 | 2 | 3 | 4 | 5 | 6 | 7 | 6 | 5 | 4 | 3 | 2 | 1 | 0 | 7 |
| 207h | 7 | 6 | 5 | 4 | 3 | 2 | 1 | 0 | 0 | 1 | 2 | 3 | 4 | 5 | 6 | 7 | 7 | 6 | 5 | 4 | 3 | 2 | 1 | 0 |
| 208a | 0 | 7 | 6 | 5 | 4 | 3 | 2 | 1 | 0 | 1 | 2 | 3 | 4 | 5 | 6 | 7 | 0 | 7 | 6 | 5 | 4 | 3 | 2 | 1 |
| 208b | 1 | 0 | 7 | 6 | 5 | 4 | 3 | 2 | 0 | 1 | 2 | 3 | 4 | 5 | 6 | 7 | 1 | 0 | 7 | 6 | 5 | 4 | 3 | 2 |
| 208c | 2 | 1 | 0 | 7 | 6 | 5 | 4 | 3 | 0 | 1 | 2 | 3 | 4 | 5 | 6 | 7 | 2 | 1 | 0 | 7 | 6 | 5 | 4 | 3 |
| 208d | 3 | 2 | 1 | 0 | 7 | 6 | 5 | 4 | 0 | 1 | 2 | 3 | 4 | 5 | 6 | 7 | 3 | 2 | 1 | 0 | 7 | 6 | 5 | 4 |
| 208e | 4 | 3 | 2 | 1 | 0 | 7 | 6 | 5 | 0 | 1 | 2 | 3 | 4 | 5 | 6 | 7 | 4 | 3 | 2 | 1 | 0 | 7 | 6 | 5 |
| 208f | 5 | 4 | 3 | 2 | 1 | 0 | 7 | 6 | 0 | 1 | 2 | 3 | 4 | 5 | 6 | 7 | 5 | 4 | 3 | 2 | 1 | 0 | 7 | 6 |
| 208g | 6 | 5 | 4 | 3 | 2 | 1 | 0 | 7 | 0 | 1 | 2 | 3 | 4 | 5 | 6 | 7 | 6 | 5 | 4 | 3 | 2 | 1 | 0 | 7 |
| 208h | 7 | 6 | 5 | 4 | 3 | 2 | 1 | 0 | 0 | 1 | 2 | 3 | 4 | 5 | 6 | 7 | 7 | 6 | 5 | 4 | 3 | 2 | 1 | 0 |
| 206a | | | | | | | | | 0a | 57a | 50a | 43a | 36a | 29a | 22a | 15a | 0b | 57b | 50b | 43b | 36b | 29b | 22b | 15b |
| 206b | | | | | | | | | 8a | 1a | 58a | 51a | 44a | 37a | 30a | 23a | 8b | 1b | 58b | 51b | 44b | 37b | 30b | 23b |
| 206c | | | | | | | | | 16a | 9a | 2a | 59a | 52a | 45a | 38a | 31a | 16b | 9b | 2b | 59b | 52b | 45b | 38b | 31b |
| 206d | | | | | | | | | 24a | 17a | 10a | 3a | 60a | 53a | 46a | 39a | 24b | 17b | 10b | 3b | 60b | 53b | 46b | 39b |
| 206e | | | | | | | | | 32a | 25a | 18a | 11a | 4a | 61a | 54a | 47a | 32b | 25b | 18b | 11b | 4b | 61b | 54b | 47b |
| 206f | | | | | | | | | 40a | 33a | 26a | 19a | 12a | 5a | 62a | 55a | 40b | 33b | 26b | 19b | 12b | 5b | 62b | 55b |
| 206g | | | | | | | | | 48a | 41a | 34a | 27a | 20a | 13a | 6a | 63a | 48b | 41b | 34b | 27b | 20b | 13b | 6b | 63b |
| 206h | | | | | | | | | 56a | 49a | 42a | 35a | 28a | 21a | 14a | 7a | 56b | 49b | 42b | 35b | 28b | 21b | 14b | 7b |
| out0 | | | | | | | | | 0a | 1a | 2a | 3a | 4a | 5a | 6a | 7a | 0b | 1b | 2b | 3b | 4b | 5b | 6b | 7b |
| out1 | | | | | | | | | 8a | 9a | 10a | 11a | 12a | 13a | 14a | 15a | 8b | 9b | 10b | 11b | 12b | 13b | 14b | 15b |
| out2 | | | | | | | | | 16a | 17a | 18a | 19a | 20a | 21a | 22a | 23a | 16b | 17b | 18b | 19b | 20b | 21b | 22b | 23b |
| out3 | | | | | | | | | 24a | 25a | 26a | 27a | 28a | 29a | 30a | 31a | 24b | 25b | 26b | 27b | 28b | 29b | 30b | 31b |
| out4 | | | | | | | | | 32a | 33a | 34a | 35a | 36a | 37a | 38a | 39a | 32b | 33b | 34b | 35b | 36b | 37b | 38b | 39b |
| out5 | | | | | | | | | 40a | 41a | 42a | 43a | 44a | 45a | 46a | 47a | 40b | 41b | 42b | 43b | 44b | 45b | 46b | 47b |
| out6 | | | | | | | | | 48a | 49a | 50a | 51a | 52a | 53a | 54a | 55a | 48b | 49b | 50b | 51b | 52b | 53b | 54b | 55b |
| out7 | | | | | | | | | 56a | 57a | 58a | 59a | 60a | 61a | 62a | 63a | 56b | 57b | 58b | 59b | 60b | 61b | 62b | 63b |

ADDRESS POSITION

| RAM CIRCUIT | 0 | 1 | 2 | 3 | 4 | 5 | 6 | 7 |
|---|---|---|---|---|---|---|---|---|
| 210a | 0a | 57a | 50a | 43a | 36a | 29a | 22a | 15a |
| 210b | 8a | 1a | 58a | 51a | 44a | 37a | 30a | 23a |
| 210c | 16a | 9a | 2a | 59a | 52a | 45a | 38a | 31a |
| 210d | 24a | 17a | 10a | 3a | 60a | 53a | 46a | 39a |
| 210e | 32a | 25a | 18a | 11a | 4a | 61a | 54a | 47a |
| 210f | 40a | 33a | 26a | 19a | 12a | 5a | 62a | 55a |
| 210g | 48a | 41a | 34a | 27a | 20a | 13a | 6a | 63a |
| 210h | 56a | 49a | 42a | 35a | 28a | 21a | 14a | 7a |

Fig. 4

ADDRESS POSITION

| RAM CIRCUIT | 0 | 1 | 2 | 3 | 4 | 5 | 6 | 7 |
|---|---|---|---|---|---|---|---|---|
| 210a | 0b | 15b | 22b | 29b | 36b | 43b | 50b | 57b |
| 210b | 1b | 8b | 23b | 30b | 37b | 44b | 51b | 58b |
| 210c | 2b | 9b | 16b | 31b | 38b | 45b | 52b | 59b |
| 210d | 3b | 10b | 17b | 24b | 39b | 46b | 53b | 60b |
| 210e | 4b | 11b | 18b | 25b | 32b | 47b | 54b | 61b |
| 210f | 5b | 12b | 19b | 26b | 33b | 40b | 55b | 62b |
| 210g | 6b | 13b | 20b | 27b | 34b | 41b | 48b | 63b |
| 210h | 7b | 14b | 21b | 28b | 35b | 42b | 49b | 56b |

Fig. 5

← CYCLE

| 8 | 7 | 6 | 5 | 4 | 3 | 2 | 1 | |
|---|---|---|---|---|---|---|---|---|
| P8 | P7 | P6 | P5 | P4 | P3 | P2 | P1 | |
| 56 | 48 | 40 | 32 | 24 | 16 | 8 | 0 | ps(0) |
| 57 | 49 | 41 | 33 | 25 | 17 | 9 | 1 | ps(1) |
| 58 | 50 | 42 | 34 | 26 | 18 | 10 | 2 | ps(2) |
| 59 | 51 | 43 | 35 | 27 | 19 | 11 | 3 | ps(3) |
| 60 | 52 | 44 | 36 | 28 | 20 | 12 | 4 | ps(4) |
| 61 | 53 | 45 | 37 | 29 | 21 | 13 | 5 | ps(5) |
| 62 | 54 | 46 | 38 | 30 | 22 | 14 | 6 | ps(6) |
| 63 | 55 | 47 | 39 | 31 | 23 | 15 | 7 | ps(7) |

Fig. 7

← CYCLE

| 8 | 7 | 6 | 5 | 4 | 3 | 2 | 1 | |
|---|---|---|---|---|---|---|---|---|
| Q8 | Q7 | Q6 | Q5 | Q4 | Q3 | Q2 | Q1 | |
| 7 | 6 | 5 | 4 | 3 | 2 | 1 | 0 | qs(0) |
| 15 | 14 | 13 | 12 | 11 | 10 | 9 | 8 | qs(1) |
| 23 | 22 | 21 | 20 | 19 | 18 | 17 | 16 | qs(2) |
| 31 | 30 | 29 | 28 | 27 | 26 | 25 | 24 | qs(3) |
| 39 | 38 | 37 | 36 | 35 | 34 | 33 | 32 | qs(4) |
| 47 | 46 | 45 | 44 | 43 | 42 | 41 | 40 | qs(5) |
| 55 | 54 | 53 | 52 | 51 | 50 | 49 | 48 | qs(6) |
| 63 | 62 | 61 | 60 | 59 | 58 | 57 | 56 | qs(7) |

Fig. 8

DIGITAL FILTER DEVICE, OPERATION METHOD FOR DIGITAL FILTER DEVICE, AND NON-TRANSITORY COMPUTER-READABLE MEDIUM STORING PROGRAM

This application is a National Stage Entry of PCT/JP2020/005018 filed on Feb. 10, 2020, which claims priority from Japanese Patent Application 2019-058457 filed on Mar. 26, 2019, the contents of all of which are incorporated herein by reference, in their entirety.

TECHNICAL FIELD

The present invention relates to a digital filter device, an operation method for a digital filter device, and a program that execute digital signal processing for performing a fast Fourier transform in particular.

BACKGROUND ART

As one piece of important processing in digital signal processing, there is a fast Fourier transform (hereinafter, referred to as "FFT".). For example, a frequency domain equalization (FDE) technique is known as a technique for compensating a waveform distortion during signal transmission in wireless communication or wired communication. In frequency domain equalization, signal data on a time domain are first converted into data on a frequency domain by a fast Fourier transform, and filter processing for equalization is performed next. Then, data after the filter processing are re-converted into signal data on the time domain by an inverse fast Fourier transform (Inverse FFT. Hereinafter, referred to as "IFFT".), and, thereby, a waveform distortion of an original signal on the time domain is compensated. Hereinafter, the FFT and the IFFT are noted as an "FFT/IFFT" when not being differentiated from each other.

Generally, in FFT/IFFT processing, a "butterfly computation" is used. An FFT device using a butterfly computation is described in, for example, Patent Literature 1. Patent Literature 1 also describes "twiddle multiplication" described later, i.e., multiplication using a twiddle factor.

As an efficient FFT/IFFT processing system, a butterfly computation by, for example, Cooley-Tukey described in Non Patent Literature 1 is well known. However, an FFT/IFFT by Cooley-Tukey with a large number of points complicates a circuit. Thus, FFT/IFFT processing is performed by dividing into two small FFT/IFFTs by use of, for example, a prime factor method described in Non Patent Literature 2.

FIG. 6 illustrates a data flow 500 of a 64-point FFT divided into two stages of radix-8 butterfly computations by utilizing, for example, the prime factor method. The data flow 500 includes a total of 16 pieces of radix-8 butterfly computation processing composed of data rearrangement processing 501, and butterfly computation processing 502 and 503, and twiddle multiplication processing 504.

In the data flow in FIG. 6, data x(n) (n=0, 1, . . . , 63) of an input time domain are performed a Fourier transform into a signal X(k) (k=0, 1, . . . , 63) of a frequency domain by FFT processing. In FIG. 6, illustration of a part of the data flow is omitted. Note that, the data flow in FIG. 6 has the same basic configuration in a case of performing IFFT processing as well.

A huge-scaled circuit is required in order to achieve the whole of the data flow in FIG. 6 with a circuit. Thus, a general method achieves the whole of FFT processing by iteratively using a circuit that achieves processing of a part of a data flow according to necessary processing performance.

For example, in the data flow in FIG. 6, when an FFT device that performs FFT processing for 8 pieces of data in parallel (hereinafter, briefly referred to as "in 8-data parallel") is produced as a physical circuit, 64-point FFT processing can be achieved by a total of 8 pieces of iteration processing.

8 pieces of iteration processing perform, in order, pieces of processing each corresponding to each of partial data flows 505a to 505h performed for 8 pieces of data, and, specifically, is performed as follows. Processing corresponding to the partial data flow 505a is performed for a first time, processing corresponding to the partial data flow 505b is performed for a second time, and processing corresponding to the partial data flow 505c (not illustrated) is performed for a third time. Thereafter, pieces of processing up to processing corresponding to the partial data flow 505h for an eighth time are performed in order in a similar way. The 64-point FFT processing is achieved by the above processing.

In a butterfly computation, pieces of data arranged in a sequential order are read in an order according to a predetermined rule, and processed. Thus, the butterfly computation needs rearrangement of data, and, for achievement of a circuit therefor, mainly uses a random access memory (RAM) circuit. An FFT device that performs rearrangement of data using a RAM circuit in a butterfly computation is described in, for example, Patent Literature 2. Moreover, regarding an FFT computation device in which a memory usage amount is reduced, a speed-up technique by parallel processing of a butterfly computation is described in, for example, Patent Literature 3.

CITATION LIST

Patent Literature

[Patent Literature 1] Japanese Unexamined Patent Application Publication No. H08-137832
[Patent Literature 2] Japanese Unexamined Patent Application Publication No. 2001-56806
[Patent Literature 3] Japanese Unexamined Patent Application Publication No. 2012-22500

Non Patent Literature

[Non Patent Literature 1] J. W. Cooley, J. W. Tukey, "An Algorithm for the Machine Calculation of Complex Fourier Series," Mathematics of Computation, US, American Mathematical Society, April 1965, Vol. 19, No. 90, pp. 297-301
[Non Patent Literature 2] D. P. Kolba, "A Prime Factor FFT Algorithm Using High-Speed Convolution," IEEE Trans. on Acoustics, US, IEEE Signal Processing Society, August 1977, Vol. 29, No. 4, pp. 281-294

SUMMARY OF INVENTION

Rearrangement processing of data necessary in a butterfly computation specifically includes rearrangement from a "sequential order" to a "bit reverse order", and rearrangement, opposite thereto, from a "bit reverse order" to a "sequential order".

Herein, the "sequential order" and the "bit reverse order" are specifically described. A "sequential order" for 64 pieces of data is illustrated in FIG. 7. The "sequential order" refers to an order of 8 data sets P1, P2, P3, P4, P5, P6, P7, and P8 in FIG. 7. A data set Ps (s is a value indicating an order of a processing cycle. s=1, ..., 8) is constituted of 8 pieces of data each arranged in order from ps(0) to ps(7), and ps(i) is $$ps(i)=8(s-1)+i.$$

Then, each data set is arranged in an order of P1, P2, P3, P4, P5, P6, P7, and P8 in association with progress of a cycle of processing. In other words, a sequential order is an order in which s data sets produced by arranging i×s pieces of data in a data order from head data i by i, and the data sets are arranged in a cycle order.

On the other hand, the "bit reverse order" refers to an order of 8 data sets Q1, Q2, Q3, Q4, Q5, Q6, Q7, and Q8 illustrated in FIG. 8. Each data set Qs is constituted of 8 pieces of data from qs(0) to qs(7), and qs(i) is $$qs(i)=(s-1)+8i.$$

Then, each data set is arranged in an order of Q1, Q2, Q3, Q4, Q5, Q6, Q7, and Q8 in association with progress of a cycle of processing. In other words, a bit reverse order is an order in which i×s pieces of data input in a sequential order are arranged in a cycle order from head data s by s, and i pieces of data of the same cycle are arranged in a data order as one set.

As above, each data set in a bit reverse order is uniquely determined when each set in a sequential order is set. An i-th piece of data of data constituting each data set Qs (s=1, ..., 8) in a bit reverse order is an s-th piece of data of data in a cycle i according to a sequential order. In other words, $$Qs(i)=Pi(s).$$

In this way, Qs(i) and Pi(s) are in a relation in which an order for progress of a cycle and an order for a data position regarding data constituting each data set are interchanged. Therefore, data input in a bit reverse order are put in a sequential order when rearranged according to a bit reverse order.

As illustrated in FIGS. 7 and 8, in rearrangement from a sequential order to a bit reverse order and rearrangement from a bit reverse order to a sequential order, each of a plurality of pieces of data output in a certain cycle is a piece of data input in a differing cycle from one another. For example, when rearrangement processing is performed in 8-parallel, 8 pieces of data constituting a data set Q1 output, for example, in a first cycle are data each input in each of 8 differing cycles. In other words, data rearrangement processing is not able to start processing until all pieces of data for the number of points of an FFT are input. Therefore, the data rearrangement processing needs a storage capacity for storing data for at least the number of points of an FFT.

Furthermore, when FFT processing of a successively input signal is performed, new data are successively input even while the data rearrangement processing is performed. As a system that copes with this situation, a double buffering system is known. In the double buffering system, a storage capacity necessary for storing data input while processing is performed is prepared in addition to a storage capacity necessary for processing, and data input while processing is performed are also stored. After processing being executed is completed, next processing is started, as a target, for data input and stored during processing.

Therefore, when FFT processing of a successively input signal is performed, a storage capacity for storing data at least twice the number of points of an FFT is needed for data rearrangement processing according to the double buffering system. As a result, when the number of points of an FFT becomes large, there is a problem that a circuit scale and consumption power of a circuit that achieves the data rearrangement processing become large.

An object of the present disclosure is to provide a digital filter device in which a circuit scale and consumption power of a circuit that achieves digital signal processing using a fast Fourier transform are small.

A digital filter device according to one example embodiment includes a data rearrangement processing unit configured to rearrange a plurality of pieces of data input in a first order into a second order, wherein the data rearrangement processing unit includes at least a storage means, the data rearrangement processing unit performs writing of data into the storage means according to a first or second address order, and the data rearrangement processing unit performs data rearrangement processing by performing reading from the storage means according to the second address order for data for which writing is performed in the storage means according to the first address order, and performing reading from the storage means according to the first address order for data for which writing is performed in the storage means according to the second address order.

An operation method for a digital filter device according to one example embodiment is an operation method for a digital filter device including a data rearrangement processing unit configured to rearrange a plurality of pieces of data input in a first order into a second order, wherein the data rearrangement processing unit includes at least a storage means, the data rearrangement processing unit performs writing of data into the storage means according to a first or second address order, and the data rearrangement processing unit performs data rearrangement processing by performing reading from the storage means according to the second address order for data for which writing is performed in the storage means according to the first address order, and performing reading from the storage means according to the first address order for data for which writing is performed in the storage means according to the second address order.

A program for a digital filter device according to one example embodiment is an operation method for a digital filter device including a data rearrangement processing unit configured to rearrange a plurality of pieces of data input in a first order into a second order, wherein the data rearrangement processing unit includes at least a storage means, the data rearrangement processing unit performs writing of data into the storage means according to a first or second address order, and the data rearrangement processing unit performs data rearrangement processing by performing reading from the storage means according to the second address order for data for which writing is performed in the storage means according to the first address order, and performing reading from the storage means according to the first address order for data for which writing is performed in the storage means according to the second address order.

According to one example embodiment, a digital filter device in which a circuit scale and consumption power of a circuit that achieves digital signal processing using a fast Fourier transform are small can be provided.

BRIEF DESCRIPTION OF THE DRAWINGS

FIG. 3 is a time chart illustrating an operation of the data rearrangement processing unit according to the first example embodiment of the present invention.

FIG. 4 is a diagram illustrating a state of each of RAM circuits 210a to 210h according to the first example embodiment of the invention.

FIG. 5 is a diagram illustrating a state of each of the RAM circuits 210a to 210h according to the first example embodiment of the invention.

FIG. 7 is a diagram illustrating an array of data sets according to a sequential order in FFT processing.

FIG. 8 is a diagram illustrating an array of data sets according to a bit reverse order in FFT processing.

DESCRIPTION OF EMBODIMENTS

Figure 1:
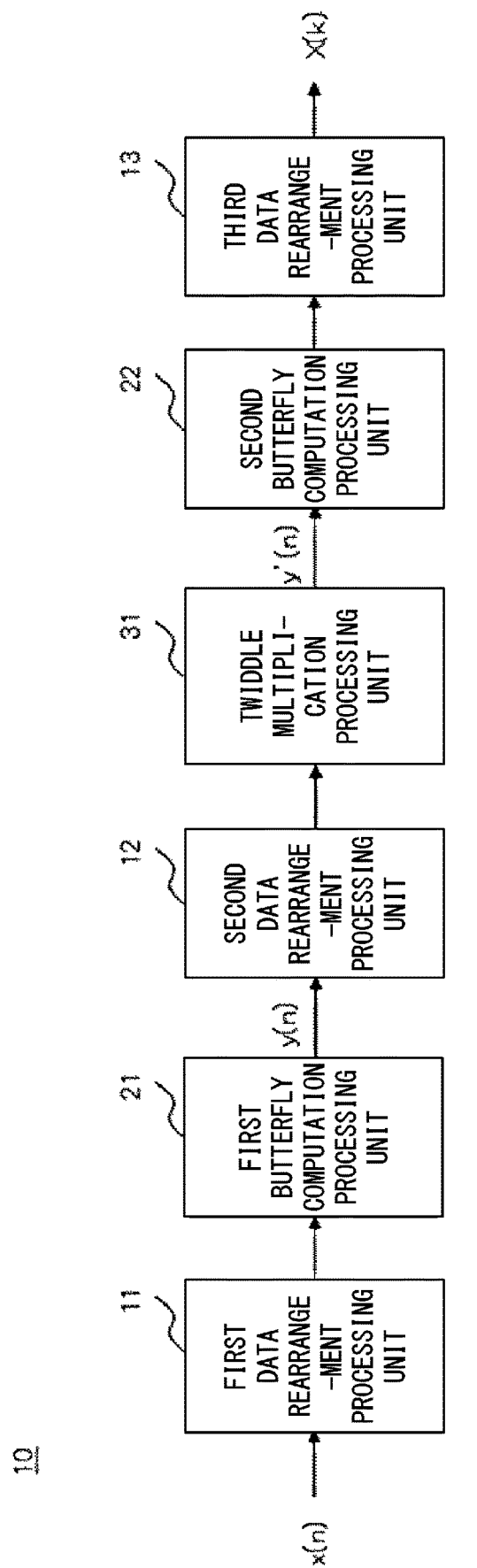
FIG. 1 is a block diagram illustrating a configuration of an FFT device 10 according to a first example embodiment of the present invention.

FIG. 1 is a block diagram illustrating a configuration example of an FFT device 10 according to a first example embodiment of the present invention. The FFT device 10 processes, by a pipeline circuit system, a 64-point FFT divided into two stages of radix-8 butterfly computations, according to a data flow 500 illustrated in FIG. 6. The FFT device 10 inputs data x(n) (n=0, 1, ..., N−1) in a time domain, performs a Fourier transform x(n) on x(n) by FFT processing, and generates and outputs a signal X(k) (k=0, 1, ..., N−1) in a frequency domain. Herein, N is a positive integer representing an FFT block size.

It is assumed that the FFT device 10 performs 64-point FFT processing in 8-data parallel. In this case, the FFT device 10 inputs the data x(n) in a time domain, generates the signal X(k) in a frequency domain performed a Fourier transform by FFT processing, and outputs the signal X(k). In this instance, as the input data x(n), a total of 64 pieces of data are input in an order illustrated in FIG. 7 by 8 pieces of data during a period of 8 cycles. Note that, herein, numbers from 0 to 63 indicated as contents of a table in FIG. 7 each mean a suffix n of x(n).

Specifically, 8 pieces of data x(0), x(1), ..., and x(7) constituting a data set P1 are input in a first cycle. Then, 8 pieces of data x(8), x(9), ..., and x(15) constituting a data set P2 are input in a second cycle. Thereafter, pieces of data constituting data sets P3 to P8 are input in a similar way from a third cycle to an eighth cycle.

Similarly, as the output data X(k), 64 pieces of data are output in an order illustrated in FIG. 7 by 8 pieces of data in a period of 8 cycles. Note that, herein, numbers from 0 to 63 indicated as contents of a table in FIG. 7 each mean a suffix k of X(k).

Specifically, 8 pieces of data X(0), X(1), ..., and X(7) constituting the data set P1 are output in a first cycle. 8 pieces of data X(8), X(9), ..., and X(15) constituting the data set P2 are output in a second cycle. Thereafter, pieces of data constituting the data sets P3 to P8 are output in a similar way from a third cycle to an eighth cycle.

The FFT device 10 includes a first data rearrangement processing unit 11, a first butterfly computation processing unit 21, a second data rearrangement processing unit 12, a twiddle multiplication processing unit 31, a second butterfly computation processing unit 22, and a third data rearrangement processing unit 13. The FFT device 10 pipeline-processes first data rearrangement processing, first butterfly computation processing, second data rearrangement processing, twiddle multiplication processing, second butterfly computation processing, and third data rearrangement processing.

The first data rearrangement processing unit 11 and the second data rearrangement processing unit 12 are buffer circuits for data rearrangement. The first data rearrangement processing unit 11 and the second data rearrangement processing unit 12 perform rearrangement of a data sequence based on a dependence relation of data on an algorithm of FFT processing before and after the first butterfly computation processing unit 21, respectively.

The third data rearrangement processing unit 13 is also a buffer circuit for data rearrangement. In other words, the third data rearrangement processing unit 13 performs rearrangement of a data sequence based on a dependence relation of data on an algorithm of FFT processing after the second butterfly computation processing unit 22.

Specifically, the first data rearrangement processing unit 11 rearranges a "sequential order" illustrated in FIG. 7 that is an input order of the input data x(n) into a "bit reverse order" illustrated in FIG. 8 that is an order of inputting to the first butterfly computation processing unit 21.

The bit reverse order illustrated in FIG. 8 is associated with an input data set to the radix-8 butterfly computation processing 502 at a first stage in a data flow diagram illustrated in FIG. 8. Specifically, 8 pieces of data x(0), x(8), ..., and x(56) constituting the data set P1 are input in a first cycle. Then, 8 pieces of data x(1), x(9), ..., and x(57) constituting the data set P2 are input in a second cycle. Thereafter, pieces of data constituting the data sets P3 to P8 are input in a similar way from a third cycle to an eighth cycle.

Each row ps(i) in FIG. 7 and each of 8 rows qs(i) in FIG. 8 indicate data input at i-th piece of data at a subsequent stage. 8 numbers included in each data set are identification information specifying one of points of an FFT, and, specifically, are a value of a suffix n of x(n).

Note that, a sequential order and a bit reverse order are not limited to those exemplified in FIGS. 7 and 8. In other words, each data set in a sequential order may be produced by arranging data in order according to the number of points of an FFT, the number of cycles, and the number of pieces of data to be processed in parallel, as described above. Then, each data set in a bit reverse order may be produced by interchanging an order for progress of a cycle and an order for a data position, of data input in a sequential order, as described above.

Figure 6:
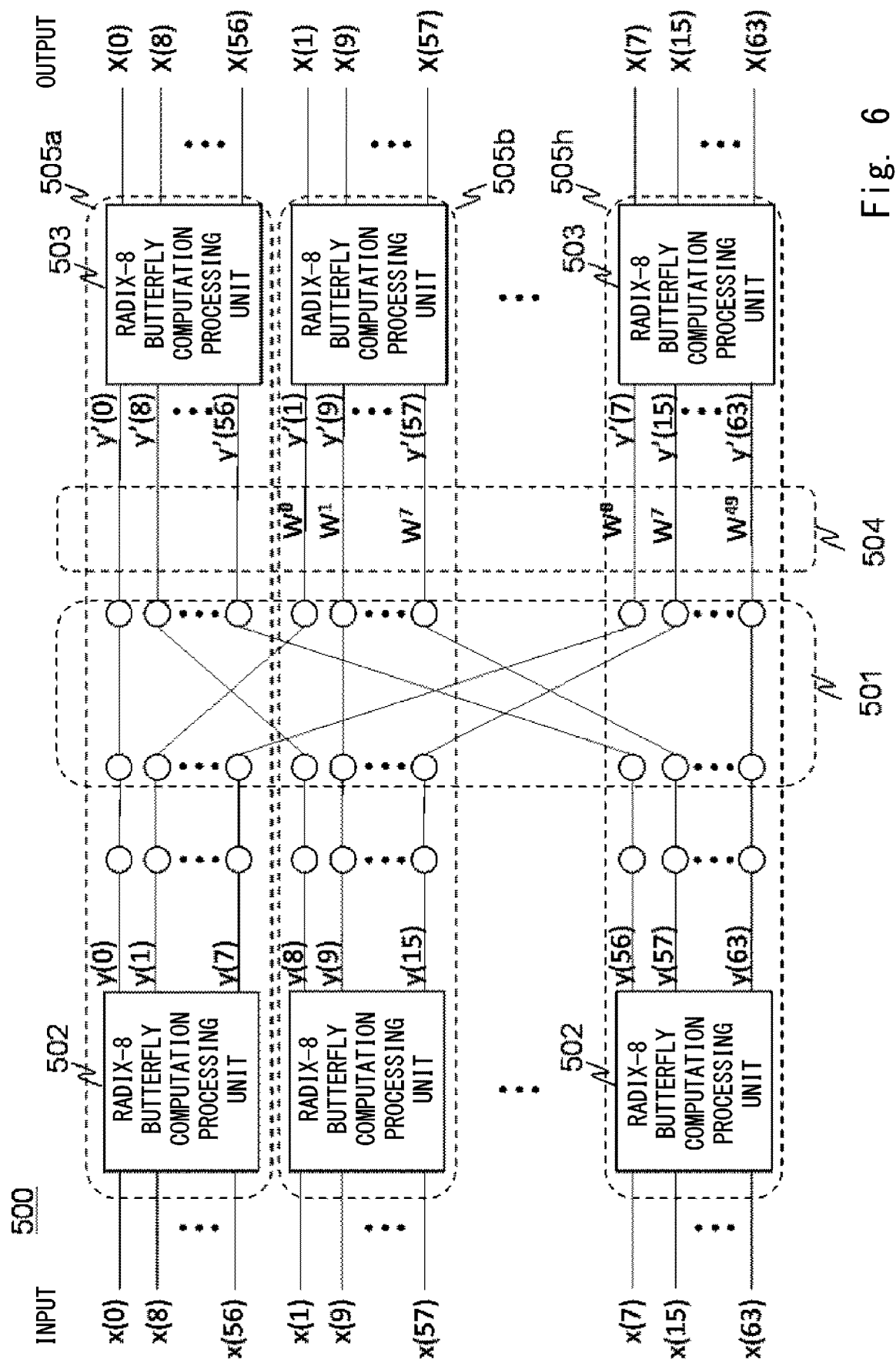
FIG. 6 is a diagram illustrating a data flow 500 of 64-point FFT processing using a 2-stage butterfly computation.

The first butterfly computation processing unit 21 is a butterfly circuit that processes butterfly computation processing 502 (first butterfly computation processing) for the first time, of radix-8 butterfly computation processing performed twice in the data flow 500 in FIG. 6. The first butterfly computation processing unit 21 outputs a result of the butterfly computation processing in a sequential order in FIG. 7, as data y(n) (n=0, 1, ..., 63).

The second data rearrangement processing unit 12 rearranges, into a bit reverse order in FIG. 8, the data y(n) output by the first butterfly computation processing unit 21 in a sequential order, in order to input the data y(n) to the second butterfly computation processing unit 22.

The twiddle multiplication processing unit 31 is a circuit that processes complex rotation on a complex plane in an FFT computation after the first butterfly computation processing, and associated with twiddle multiplication processing 504 in the data flow 500 in FIG. 6. Note that, rearrangement of data is not performed in twiddle multiplication processing.

The second butterfly computation processing unit 22 is a butterfly circuit that processes radix-8 butterfly processing 503 for a second time in a data flow diagram in FIG. 6. The second butterfly computation processing unit 22 performs butterfly computation processing for data y'(n) (n=0, 1, . . . , 63) after twiddle multiplication processing input in a bit reverse order, and outputs a result X(k) (n=0, 1, . . . , 63) in a bit reverse order again.

The third data rearrangement processing unit 13 rearranges, into a sequential order in FIG. 7, the data X(k) output by the second butterfly computation processing unit 22 in a bit reverse order.

The data rearrangement processing unit temporarily stores input data, and controls selection and output of the stored data. Thus, rearrangement processing of data according to each of a sequential order in FIG. 7 and a bit reverse order in FIG. 8 is achieved. A specific example of a data rearrangement processing unit is indicated below.

Figure 2:
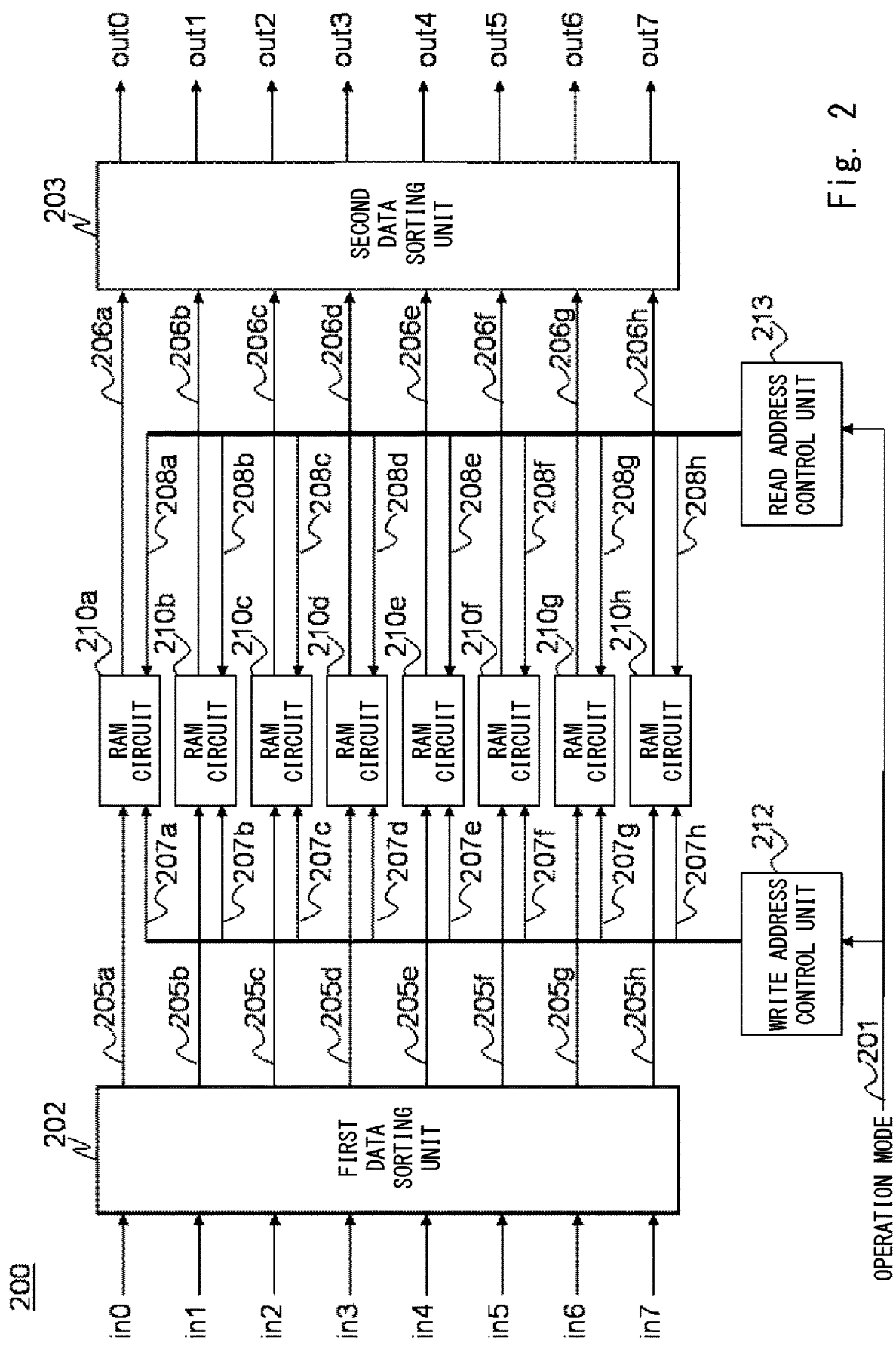
FIG. 2 is a block diagram illustrating a configuration of a data rearrangement processing unit 200 according to the first example embodiment of the present invention.

The first data rearrangement processing unit 11, the second data rearrangement processing unit 12, and the third data rearrangement processing unit 13 can be achieved by, for example, a data rearrangement processing unit 200 illustrated in FIG. 2.

The data rearrangement processing unit 200 is constituted of a first data sorting unit 202, 8 RAM circuits 210a, 210b, 210c, 210d, 210e, 210f, 210g, and 210h, a second data sorting unit 203, a write address control unit 212, and a read address control unit 213.

The first data sorting unit 202 simultaneously inputs 8 pieces of data from 8 inputs in0 to in7, performs sorting processing of the data, and outputs the data to 8 outputs 205a to 205h.

The RAM circuits 210a to 210h are RAM circuits being each capable of storing 8 pieces of data, and, therefore, the RAM circuits 210a to 210h can store, in total, 64 pieces of data being equal to the number of points of a 64-point FFT. Moreover, the RAM circuits 210a to 210h are dual-port RAM circuits being each equipped with an independent write port and read port, and prioritize reading when writing and reading occur for the same address at the same timing. In other words, the RAM circuits 210a to 210h perform writing of a write target data after reading data stored in an address targeted for writing and reading.

The RAM circuit 210a stores, in an address output to a write address 207a by the write address control unit 212, data output to 205a by the first data sorting unit 202, reads the stored data from an address output to a read address 208a by the read address control unit 213, and outputs the data to 206a.

Similarly, the RAM circuit 210b stores, in an address output to a write address 207b by the write address control unit 212, data output to 205b by the first data sorting unit 202, reads the stored data from an address output to a read address 208b by the read address control unit 213, and outputs the data to 206b.

The RAM circuit 210c stores, in an address output to a write address 207c by the write address control unit 212, data output to 205c by the first data sorting unit 202, reads the stored data from an address output to a read address 208c by the read address control unit 213, and outputs the data to 206c.

The RAM circuit 210d stores, in an address output to a write address 207d by the write address control unit 212, data output to 205d by the first data sorting unit 202, reads the stored data from an address output to a read address 208d by the read address control unit 213, and outputs the data to 206d.

The RAM circuit 210e stores, in an address output to a write address 207e by the write address control unit 212, data output to 205e by the first data sorting unit 202, reads the stored data from an address output to a read address 208e by the read address control unit 213, and outputs the data to 206e.

The RAM circuit 210f stores, in an address output to a write address 207f by the write address control unit 212, data output to 205f by the first data sorting unit 202, reads the stored data from an address output to a read address 208f by the read address control unit 213, and outputs the data to 206f.

The RAM circuit 210g stores, in an address output to a write address 207g by the write address control unit 212, data output to 205g by the first data sorting unit 202, reads the stored data from an address output to a read address 208g by the read address control unit 213, and outputs the data to 206g.

The RAM circuit 210h stores, in an address output to a write address 207h by the write address control unit 212, data output to 205h by the first data sorting unit 202, reads the stored data from an address output to a read address 208h by the read address control unit 213, and outputs the data to 206h.

The second data sorting unit 203 simultaneously inputs 8 pieces of data from the 8 inputs 206a to 206h, performs sorting processing of the data, and outputs the data to 8 outputs 207a to 207h.

The write address control unit 212 outputs, to each of 207a to 207h, an address into which each of the RAM circuits 210a to 210h writes data, with reference to an operation mode 201 to input.

The read address control unit 213 outputs, to each of 208a to 208h, an address from which each of the RAM circuits 210a to 210h reads data, with reference to the operation mode 201 to input.

Next, a specific operation of the data rearrangement processing unit 200 is described. FIG. 3 is a time chart illustrating one example of an operation of the data rearrangement processing unit 200.

The data rearrangement processing unit 200 inputs 64 pieces of data of 0a to 63a in 8-parallel from the inputs in0 to in7 in a sequential order in 8 cycles of t0 to t7, and outputs 64 pieces of data of 0a to 63a in 8-parallel to outputs out0 to out7 in a bit reverse order in 8 cycles of t9 to t15. Similarly, the data rearrangement processing unit 200 inputs 64 pieces of data of 0b to 63b in 8-parallel from the inputs in0 to in7 in a sequential order in 8 cycles of t8 to t15, and outputs 64 pieces of data of 0b to 63b in 8-parallel to the outputs out0 to out7 in a bit reverse order in 8 cycles of t16 to t23. Further, the data rearrangement processing unit 200 inputs 64 pieces of data of 0c to 63c in 8-parallel from the inputs in0 to in7 in a sequential order in 8 cycles of t16 to t23, and outputs 64 pieces of data of 0c to 63c in 8-parallel to the outputs out0 to out7 in a bit reverse order in 8 cycles of t24 to t31 (not illustrated).

First, an input operation of the data 0a to 63a in the 8 cycles of t0 to t7 is described in detail.

In the cycle t0, the first data sorting unit 202
outputs, to 205a, the data 0a input from in0,
outputs, to 205b, the data 1a input from in1,
outputs, to 205c, the data 2a input from in2,
outputs, to 205d, the data 3a input from in3,
outputs, to 205e, the data 4a input from in4,
outputs, to 205f, the data 5a input from in5,
outputs, to 205g, the data 6a input from in6, and
outputs, to 205h, the data 7a input from in7.

In the cycle t1,
outputs, to 205*b*, the data 8*a* input from in0,
outputs, to 205*c*, the data 9*a* input from in1,
outputs, to 205*d*, the data 10*a* input from in2,
outputs, to 205*e*, the data 11*a* input from in3,
outputs, to 205*f*, the data 12*a* input from in4,
outputs, to 205*g*, the data 13*a* input from in5,
outputs, to 205*h*, the data 14*a* input from in6, and
outputs, to 205*a*, the data 15*a* input from in7.
In the cycle t2,
outputs, to 205*c*, the data 16*a* input from in0,
outputs, to 205*d*, the data 17*a* input from in1,
outputs, to 205*e*, the data 18*a* input from in2,
outputs, to 205*f*, the data 19*a* input from in3,
outputs, to 205*g*, the data 20*a* input from in4,
outputs, to 205*h*, the data 21*a* input from in5,
outputs, to 205*a*, the data 22*a* input from in6, and
outputs, to 205*b*, the data 23*a* input from in7.
In the cycle t3,
outputs, to 205*d*, the data 24*a* input from in0,
outputs, to 205*e*, the data 25*a* input from in1,
outputs, to 205*f*, the data 26*a* input from in2,
outputs, to 205*g*, the data 27*a* input from in3,
outputs, to 205*h*, the data 28*a* input from in4,
outputs, to 205*a*, the data 29*a* input from in5,
outputs, to 205*b*, the data 30*a* input from in6, and
outputs, to 205*c*, the data 31*a* input from in7.
In the cycle t4,
outputs, to 205*e*, the data 32*a* input from in0,
outputs, to 205*f*, the data 33*a* input from in1,
outputs, to 205*g*, the data 34*a* input from in2,
outputs, to 205*h*, the data 35*a* input from in3,
outputs, to 205*a*, the data 36*a* input from in4,
outputs, to 205*b*, the data 37*a* input from in5,
outputs, to 205*c*, the data 38*a* input from in6, and
outputs, to 205*d*, the data 39*a* input from in7.
In the cycle t5,
outputs, to 205*f*, the data 40*a* input from in0,
outputs, to 205*g*, the data 41*a* input from in1,
outputs, to 205*h*, the data 42*a* input from in2,
outputs, to 205*a*, the data 43*a* input from in3,
outputs, to 205*b*, the data 44*a* input from in4,
outputs, to 205*c*, the data 45*a* input from in5,
outputs, to 205*d*, the data 46*a* input from in6, and
outputs, to 205*e*, the data 47*a* input from in7.
In the cycle t6,
outputs, to 205*g*, the data 48*a* input from in0,
outputs, to 205*h*, the data 49*a* input from in1,
outputs, to 205*a*, the data 50*a* input from in2,
outputs, to 205*b*, the data 51*a* input from in3,
outputs, to 205*c*, the data 52*a* input from in4,
outputs, to 205*d*, the data 53*a* input from in5,
outputs, to 205*e*, the data 54*a* input from in6, and
outputs, to 205*f*, the data 55*a* input from in7.
In the cycle t7,
outputs, to 205*h*, the data 56*a* input from in0,
outputs, to 205*a*, the data 57*a* input from in1,
outputs, to 205*b*, the data 58*a* input from in2,
outputs, to 205*c*, the data 59*a* input from in3,
outputs, to 205*d*, the data 60*a* input from in4,
outputs, to 205*e*, the data 61*a* input from in5,
outputs, to 205*f*, the data 62*a* input from in6, and
outputs, to 205*g*, the data 63*a* input from in7.

As described above, the first data sorting unit 202 performs rotation processing for 8 pieces of data simultaneously input in parallel and then outputs the processed data, and can be easily achieved by, for example, a shift circuit.

Similarly, the first data sorting unit 202 performs sorting processing for the data of 0*b* to 63*b* in the cycles of t9 to t15, and performs sorting processing for the data of 0*c* to 63*c* in the cycles of t16 to t23.

Next, write and read operations of the write address control unit 212, the read address control unit 213, and the RAM circuits 210*a* to 210*h* controlled thereby are described.

The write address control unit 212 and the read address control unit 213 each perform an operation with reference to an operation mode 210 to input. Herein, the operation mode 210 is a control signal given from a high-order control circuit (not illustrated) such as a CPU, and indicates either a first or second operation mode. The operation mode 210 indicates the same operation mode in successive 8 cycles in which data for the number of points of a 64-point FFT are input, and indicates a differing operation mode every 8 cycles. Specifically, in FIG. 3, the operation mode 210 indicates an operation mode 0 being a first operation mode in the 8 cycles of t0 to t7 in which the data 0*a* to 63*a* are input. The operation mode 210 indicates an operation mode 1 being a second operation mode in the 8 cycles of t8 to t15 in which the data 0*b* to 63*b* are input. The operation mode 210 again indicates the operation mode 0 being the first operation mode in the 8 cycles of t16 to t23 in which the data 0*c* to 63*c* are input. Thereafter, the operation mode 210 is a signal alternately indicating the operation mode 0 or the operation mode 1 every 8 cycles in a similar way.

The write address control unit 212 generates a write address according to a first address order when the operation mode 210 to input is the operation mode 0 being the first operation mode. The write address control unit 212 generates a write address according to a second address order when the operation mode 210 to input is the operation mode 1 being the second operation mode. The first address order is an address order characterized by always specifying a differing address for the RAM circuit of each of the RAM circuits 210*a* to 210*h*. In other words, in the first operation mode, a differing address is always output to each of 207*a* to 207*h*. On the other hand, the second address order is an address order characterized by always specifying the same address for the RAM circuit of each of the RAM circuits 210*a* to 210*h*. In other words, in the second operation mode, the same address is always output to each of 207*a* to 207*h*.

The read address control unit 213 also performs an operation similar to that of the write address control unit 212. In other words, the read address control unit 213 generates a write address according to the first address order when the operation mode 210 to input is the operation mode 0 being the first operation mode. The read address control unit 213 generates a write address according to the second address order when the operation mode 210 to input is the operation mode 1 being the second operation mode.

A specific example of write and read operations of the write address control unit 212, the read address control unit 213, and the RAM circuits 210*a* to 210*h* are described with reference to FIG. 3.

First, in the 8 cycles of t0 to t7, the data 0*a* to 63*a* are written into the RAM circuits 210*a* to 210*h*. In the 8 cycles of t8 to t15, the data 0*a* to 63*a* written in the RAM circuits 210*a* to 210*h* are read, and the data 0*b* to 63*b* are written into the RAM circuits 210*a* to 210*h*. In the 8 cycles of t16 to t23, the data 0*b* to 63*b* written in the RAM circuits 210*a* to 210*h* are read, and the data 0*c* to 63*c* are written into the RAM circuits 210*a* to 210*h*. Note that, a read operation of data written in 8 cycles before t0 to t7 are performed in the 8 cycles of t0 to t7, but illustration thereof is omitted.

Further, writing and reading in the RAM circuits 210a to 210h are always performed for the same address in the same cycle, as apparent from FIG. 3. The RAM circuits 210a to 210h are RAM circuits that each prioritize reading when writing and reading occur for the same address at the same timing. Thus, in the RAM circuits 210a to 210h, the data 0b to 63b are written after the data 0a to 63a are read in each of the cycles of t8 to t15. Similarly, the data 0c to 63c are written after the data 0b to 63b are read in each of the cycles of t16 to t23.

Next, details of write operations of the write address control unit 212, and the RAM circuits 210a to 210h controlled thereby in the cycles of t0 to t7 are illustrated.

With reference to FIG. 3, in 8 cycles of t0 to t7, the operation mode 210 indicates the operation mode 0 being the first operation mode, and the write address control unit 212 generates a write address according to the first address order. The RAM circuits 210a to 210h write, into the write address generated by the write address control unit 212, data to be output to 207a to 207h by the first data sorting unit 202.

Specifically, in the cycle t0, the RAM circuit 210a writes the data 0a into an address 0 output to the write address 207a by the write address control unit 212.

The RAM circuit 210b writes the data 1a into an address 1 output to the write address 207b by the write address control unit 212.

The RAM circuit 210c writes the data 2a into an address 2 output to the write address 207c by the write address control unit 212.

The RAM circuit 210d writes the data 3a into an address 3 output to the write address 207d by the write address control unit 212.

The RAM circuit 210e writes the data 4a into an address 4 output to the write address 207e by the write address control unit 212.

The RAM circuit 210f writes the data 5a into an address 5 output to the write address 207f by the write address control unit 212.

The RAM circuit 210g writes the data 6a into an address 6 output to the write address 207g by the write address control unit 212.

The RAM circuit 210h writes the data 7a into an address 7 output to the write address 207h by the write address control unit 212.

In the cycle t1, the RAM circuit 210a writes the data 15a into an address 7 output to the write address 207a by the write address control unit 212.

The RAM circuit 210b writes the data 8a into an address 0 output to the write address 207b by the write address control unit 212.

The RAM circuit 210c writes the data 9a into an address 1 output to the write address 207c by the write address control unit 212.

The RAM circuit 210d writes the data 10a into an address 2 output to the write address 207d by the write address control unit 212.

The RAM circuit 210e writes the data 11a into an address 3 output to the write address 207e by the write address control unit 212.

The RAM circuit 210f writes the data 12a into an address 4 output to the write address 207f by the write address control unit 212.

The RAM circuit 210g writes the data 13a into an address 5 output to the write address 207g by the write address control unit 212.

The RAM circuit 210h writes the data 14a into an address 6 output to the write address 207h by the write address control unit 212.

In the cycle t2, the RAM circuit 210a writes the data 22a into an address 6 output to the write address 207a by the write address control unit 212.

The RAM circuit 210b writes the data 23a into an address 7 output to the write address 207b by the write address control unit 212.

The RAM circuit 210c writes the data 16a into an address 0 output to the write address 207c by the write address control unit 212.

The RAM circuit 210d writes the data 17a into an address 1 output to the write address 207d by the write address control unit 212.

The RAM circuit 210e writes the data 18a into an address 2 output to the write address 207e by the write address control unit 212.

The RAM circuit 210f writes the data 19a into an address 3 output to the write address 207f by the write address control unit 212.

The RAM circuit 210g writes the data 20a into an address 4 output to the write address 207g by the write address control unit 212.

The RAM circuit 210h writes the data 21a into an address 5 output to the write address 207h by the write address control unit 212.

In the cycle t3, the RAM circuit 210a writes the data 29a into an address 5 output to the write address 207a by the write address control unit 212.

The RAM circuit 210b writes the data 30a into an address 6 output to the write address 207b by the write address control unit 212.

The RAM circuit 210c writes the data 31a into an address 7 output to the write address 207c by the write address control unit 212.

The RAM circuit 210d writes the data 24a into an address 0 output to the write address 207d by the write address control unit 212.

The RAM circuit 210e writes the data 25a into an address 1 output to the write address 207e by the write address control unit 212.

The RAM circuit 210f writes the data 26a into an address 2 output to the write address 207f by the write address control unit 212.

The RAM circuit 210g writes the data 27a into an address 3 output to the write address 207g by the write address control unit 212.

The RAM circuit 210h writes the data 28a into an address 4 output to the write address 207h by the write address control unit 212.

In the cycle t4, the RAM circuit 210a writes the data 36a into an address 4 output to the write address 207a by the write address control unit 212.

The RAM circuit 210b writes the data 37a into an address 5 output to the write address 207b by the write address control unit 212.

The RAM circuit 210c writes the data 38a into an address 6 output to the write address 207c by the write address control unit 212.

The RAM circuit 210d writes the data 39a into an address 7 output to the write address 207d by the write address control unit 212.

The RAM circuit 210e writes the data 32a into an address 0 output to the write address 207e by the write address control unit 212.

The RAM circuit 210f writes the data 33a into an address 1 output to the write address 207f by the write address control unit 212.

The RAM circuit 210g writes the data 34a into an address 2 output to the write address 207g by the write address control unit 212.

The RAM circuit 210h writes the data 35a into an address 3 output to the write address 207h by the write address control unit 212.

In the cycle t5, the RAM circuit 210a writes the data 43a into an address 3 output to the write address 207a by the write address control unit 212.

The RAM circuit 210b writes the data 44a into an address 4 output to the write address 207b by the write address control unit 212.

The RAM circuit 210c writes the data 45a into an address 5 output to the write address 207c by the write address control unit 212.

The RAM circuit 210d writes the data 46a into an address 6 output to the write address 207d by the write address control unit 212.

The RAM circuit 210e writes the data 47a into an address 7 output to the write address 207e by the write address control unit 212.

The RAM circuit 210f writes the data 40a into an address 0 output to the write address 207f by the write address control unit 212.

The RAM circuit 210g writes the data 41a into an address 1 output to the write address 207g by the write address control unit 212.

The RAM circuit 210h writes the data 42a into an address 2 output to the write address 207h by the write address control unit 212.

In the cycle t6, the RAM circuit 210a writes the data 50a into an address 2 output to the write address 207a by the write address control unit 212.

The RAM circuit 210b writes the data 51a into an address 3 output to the write address 207b by the write address control unit 212.

The RAM circuit 210c writes the data 52a into an address 4 output to the write address 207c by the write address control unit 212.

The RAM circuit 210d writes the data 53a into an address 5 output to the write address 207d by the write address control unit 212.

The RAM circuit 210e writes the data 54a into an address 6 output to the write address 207e by the write address control unit 212.

The RAM circuit 210f writes the data 55a into an address 7 output to the write address 207f by the write address control unit 212.

The RAM circuit 210g writes the data 48a into an address 0 output to the write address 207g by the write address control unit 212.

The RAM circuit 210h writes the data 49a into an address 1 output to the write address 207h by the write address control unit 212.

In the cycle t7, the RAM circuit 210a writes the data 57a into an address 1 output to the write address 207a by the write address control unit 212.

The RAM circuit 210b writes the data 58a into an address 2 output to the write address 207b by the write address control unit 212.

The RAM circuit 210c writes the data 59a into an address 3 output to the write address 207c by the write address control unit 212.

The RAM circuit 210d writes the data 60a into an address 4 output to the write address 207d by the write address control unit 212.

The RAM circuit 210e writes the data 61a into an address 5 output to the write address 207e by the write address control unit 212.

The RAM circuit 210f writes the data 62a into an address 6 output to the write address 207f by the write address control unit 212.

The RAM circuit 210g writes the data 63a into an address 7 output to the write address 207g by the write address control unit 212.

The RAM circuit 210h writes the data 56a into an address 0 output to the write address 207h by the write address control unit 212.

As described above, in the first address order, addresses differing from one another are output to the write addresses 207a to 207h indicating write addresses of the RAM circuits 210a to 210h. Moreover, a differing address is output to each of the write addresses 207a to 207h in each of the cycles of t0 to t7. For example, a differing address of the addresses 0 to 7 is output to the write address 207a in each of the cycles of t0 to t7.

Next, a specific example of read operations of the read address control unit 213, and the RAM circuits 210a to 210h controlled thereby in the cycles of t8 to t15 are illustrated.

As a result of the write operations in the cycles of t0 to t7, each piece of the data 0a to 63a is stored in each of the RAM circuits 210a to 210h at a point of the cycle t8, as illustrated in FIG. 4.

In the 8 cycles of t8 to t15, the operation mode 210 indicates the operation mode 1 being the second operation mode, and the read address control unit 213 generates a read address according to the second address order. The RAM circuits 210a to 210h output the stored data to the outputs 206a to 206h from the read address generated by the read address control unit 213.

Specifically, in the cycle t8, the read address control unit 213 outputs the address 0 to all of the read addresses 208a to 208h.

The RAM circuit 210a reads the data 0a from the address 0.
The RAM circuit 210b reads the data 8a from the address 0.
The RAM circuit 210c reads the data 16a from the address 0.
The RAM circuit 210d reads the data 24a from the address 0.
The RAM circuit 210e reads the data 32a from the address 0.
The RAM circuit 210f reads the data 40a from the address 0.
The RAM circuit 210g reads the data 48a from the address 0.
The RAM circuit 210h reads the data 56a from the address 0.

Specifically, in the cycle t9, the read address control unit 213 outputs the address 1 to all of the read addresses 208a to 208h.

The RAM circuit 210a reads the data 57a from the address 1.
The RAM circuit 210b reads the data 1a from the address 1.
The RAM circuit 210c reads the data 9a from the address 1.

The RAM circuit 210*d* reads the data 17*a* from the address 1.
The RAM circuit 210*e* reads the data 25*a* from the address 1.
The RAM circuit 210*f* reads the data 33*a* from the address 1.
The RAM circuit 210*g* reads the data 41*a* from the address 1.
The RAM circuit 210*h* reads the data 49*a* from the address 1.

In the cycle t10, the read address control unit 213 outputs the address 2 to all of the read addresses 208*a* to 208*h*.
The RAM circuit 210*a* reads the data 50*a* from the address 2.
The RAM circuit 210*b* reads the data 58*a* from the address 2.
The RAM circuit 210*c* reads the data 2*a* from the address 2.
The RAM circuit 210*d* reads the data 10*a* from the address 2.
The RAM circuit 210*e* reads the data 18*a* from the address 2.
The RAM circuit 210*f* reads the data 26*a* from the address 2.
The RAM circuit 210*g* reads the data 34*a* from the address 2.
The RAM circuit 210*h* reads the data 42*a* from the address 2.

In the cycle t11, the read address control unit 213 outputs the address 3 to all of the read addresses 208*a* to 208*h*.
The RAM circuit 210*a* reads the data 43*a* from the address 3.
The RAM circuit 210*b* reads the data 51*a* from the address 3.
The RAM circuit 210*c* reads the data 59*a* from the address 3.
The RAM circuit 210*d* reads the data 3*a* from the address 3.
The RAM circuit 210*e* reads the data 11*a* from the address 3.
The RAM circuit 210*f* reads the data 19*a* from the address 3.
The RAM circuit 210*g* reads the data 27*a* from the address 3.
The RAM circuit 210*h* reads the data 35*a* from the address 3.

In the cycle t12, the read address control unit 213 outputs the address 4 to all of the read addresses 208*a* to 208*h*.
The RAM circuit 210*a* reads the data 36*a* from the address 4.
The RAM circuit 210*b* reads the data 44*a* from the address 4.
The RAM circuit 210*c* reads the data 52*a* from the address 4.
The RAM circuit 210*d* reads the data 60*a* from the address 4.
The RAM circuit 210*e* reads the data 4*a* from the address 4.
The RAM circuit 210*f* reads the data 12*a* from the address 4.
The RAM circuit 210*g* reads the data 20*a* from the address 4.
The RAM circuit 210*h* reads the data 28*a* from the address 4.

In the cycle t13, the read address control unit 213 outputs the address 5 to all of the read addresses 208*a* to 208*h*.
The RAM circuit 210*a* reads the data 29*a* from the address 5.
The RAM circuit 210*b* reads the data 37*a* from the address 5.
The RAM circuit 210*c* reads the data 45*a* from the address 5.
The RAM circuit 210*d* reads the data 53*a* from the address 5.
The RAM circuit 210*e* reads the data 61*a* from the address 5.
The RAM circuit 210*f* reads the data 5*a* from the address 5.
The RAM circuit 210*g* reads the data 13*a* from the address 5.
The RAM circuit 210*h* reads the data 21*a* from the address 5.

In the cycle t14, the read address control unit 213 outputs the address 6 to all of the read addresses 208*a* to 208*h*.
The RAM circuit 210*a* reads the data 22*a* from the address 6.
The RAM circuit 210*b* reads the data 30*a* from the address 6.
The RAM circuit 210*c* reads the data 38*a* from the address 6.
The RAM circuit 210*d* reads the data 46*a* from the address 6.
The RAM circuit 210*e* reads the data 54*a* from the address 6.
The RAM circuit 210*f* reads the data 62*a* from the address 6.
The RAM circuit 210*g* reads the data 6*a* from the address 6.
The RAM circuit 210*h* reads the data 14*a* from the address 6.

In the cycle t15, the read address control unit 213 outputs the address 7 to all of the read addresses 208*a* to 208*h*.
The RAM circuit 210*a* reads the data 15*a* from the address 7.
The RAM circuit 210*b* reads the data 23*a* from the address 7.
The RAM circuit 210*c* reads the data 31*a* from the address 7.
The RAM circuit 210*d* reads the data 39*a* from the address 7.
The RAM circuit 210*e* reads the data 47*a* from the address 7.
The RAM circuit 210*f* reads the data 55*a* from the address 7.
The RAM circuit 210*g* reads the data 63*a* from the address 7.
The RAM circuit 210*h* reads the data 7*a* from the address 7.

As described above, in the second address order, the same address is output to all of the read addresses 208*a* to 208*h* indicating read addresses of the RAM circuits 210*a* to 210*h*. Moreover, a differing address is output to each of the read addresses 208*a* to 208*h* in each of the cycles of t8 to t15. For example, a differing address of the addresses 0 to 7 is output to the write address 208*a* in each of the cycles of t8 to t15.

Next, a specific example of write operations of the write address control unit 212, and the RAM circuits 210*a* to 210*h* controlled thereby in the cycles of t8 to t15 are illustrated.

In the 8 cycles of t8 to t15, the operation mode 210 indicates the operation mode 1 being the second operation mode, and the write address control unit 212 generates a write address according to the second address order. The RAM circuits 210*a* to 210*h* write, into the write address generated by the write address control unit 212, data to be output to the outputs 207*a* to 207*h* by the first data sorting unit 202.

Specifically, in the cycle t8, the write address control unit 212 outputs the address 0 to all of the write addresses 207*a* to 207*h*.

The RAM circuit 210*a* writes the data 0*b* into the address 0.

The RAM circuit 210b writes the data 1b into the address 0.
The RAM circuit 210c writes the data 2b into the address 0.
The RAM circuit 210d writes the data 3b into the address 0.
The RAM circuit 210e writes the data 4b into the address 0.
The RAM circuit 210f writes the data 5b into the address 0.
The RAM circuit 210g writes the data 6b into the address 0.
The RAM circuit 210h writes the data 7b into the address 0.

In the cycle t9, the write address control unit 212 outputs the address 1 to all of the write addresses 207a to 207h.
The RAM circuit 210a writes the data 15b into the address 1.
The RAM circuit 210b writes the data 8b into the address 1.
The RAM circuit 210c writes the data 9b into the address 1.
The RAM circuit 210d writes the data 10b into the address 1.
The RAM circuit 210e writes the data 11b into the address 1.
The RAM circuit 210f writes the data 12b into the address 1.
The RAM circuit 210g writes the data 13b into the address 1.
The RAM circuit 210h writes the data 14b into the address 1.

In the cycle t10, the write address control unit 212 outputs the address 2 to all of the write addresses 207a to 207h.
The RAM circuit 210a writes the data 22b into the address 2.
The RAM circuit 210b writes the data 23b into the address 2.
The RAM circuit 210c writes the data 16b into the address 2.
The RAM circuit 210d writes the data 17b into the address 2.
The RAM circuit 210e writes the data 18b into the address 2.
The RAM circuit 210f writes the data 19b into the address 2.
The RAM circuit 210g writes the data 20b into the address 2.
The RAM circuit 210h writes the data 21b into the address 2.

In the cycle t11, the write address control unit 212 outputs the address 3 to all of the write addresses 207a to 207h.
The RAM circuit 210a writes the data 29b into the address 3.
The RAM circuit 210b writes the data 30b into the address 3.
The RAM circuit 210c writes the data 31b into the address 3.
The RAM circuit 210d writes the data 24b into the address 3.
The RAM circuit 210e writes the data 25b into the address 3.
The RAM circuit 210f writes the data 26b into the address 3.
The RAM circuit 210g writes the data 27b into the address 3.
The RAM circuit 210h writes the data 28b into the address 3.

In the cycle t12, the write address control unit 212 outputs the address 4 to all of the write addresses 207a to 207h.
The RAM circuit 210a writes the data 36b into the address 4.
The RAM circuit 210b writes the data 37b into the address 4.
The RAM circuit 210c writes the data 38b into the address 4.
The RAM circuit 210d writes the data 39b into the address 4.
The RAM circuit 210e writes the data 32b into the address 4.
The RAM circuit 210f writes the data 33b into the address 4.
The RAM circuit 210g writes the data 34b into the address 4.
The RAM circuit 210h writes the data 35b into the address 4.

In the cycle t13, the write address control unit 212 outputs the address 5 to all of the write addresses 207a to 207h.
The RAM circuit 210a writes the data 43b into the address 5.
The RAM circuit 210b writes the data 44b into the address 5.
The RAM circuit 210c writes the data 45b into the address 5.
The RAM circuit 210d writes the data 46b into the address 5.
The RAM circuit 210e writes the data 47b into the address 5.
The RAM circuit 210f writes the data 40b into the address 5.
The RAM circuit 210g writes the data 41b into the address 5.
The RAM circuit 210h writes the data 42b into the address 5.

In the cycle t14, the write address control unit 212 outputs the address 6 to all of the write addresses 207a to 207h.
The RAM circuit 210a writes the data 50b into the address 6.
The RAM circuit 210b writes the data 51b into the address 6.
The RAM circuit 210c writes the data 52b into the address 6.
The RAM circuit 210d writes the data 53b into the address 6.
The RAM circuit 210e writes the data 54b into the address 6.
The RAM circuit 210f writes the data 55b into the address 6.
The RAM circuit 210g writes the data 41b into the address 6.
The RAM circuit 210h writes the data 42b into the address 6.

In the cycle t15, the write address control unit 212 outputs the address 7 to all of the write addresses 207a to 207h.
The RAM circuit 210a writes the data 57b into the address 7.
The RAM circuit 210b writes the data 58b into the address 7.
The RAM circuit 210c writes the data 59b into the address 7.
The RAM circuit 210d writes the data 60b into the address 7.
The RAM circuit 210e writes the data 61b into the address 7.
The RAM circuit 210f writes the data 62b into the address 7.
The RAM circuit 210g writes the data 63b into the address 7.
The RAM circuit 210h writes the data 56b into the address 7.

As described above, in the second address order, the same address is output to all of the write addresses 207a to 207h indicating write addresses of the RAM circuits 210a to 210h.

Moreover, a differing address is output to each of the write addresses 207*a* to 207*h* in each of the cycles of t8 to t15. For example, a differing address of the addresses 0 to 7 is output to the write address 207*a* in each of the cycles of t0 to t7.

Next, a specific example of read operations of the read address control unit 213, and the RAM circuits 210*a* to 210*h* controlled thereby in the cycles of t16 to t23 are illustrated.

As a result of the write operations in the cycles of t8 to t15, each piece of the data 0*b* to 63*b* is stored in each of the RAM circuits 210*a* to 210*h* at a point of the cycle t16, as illustrated in FIG. 5.

In 8 cycles of t16 to t23, the operation mode 210 indicates the operation mode 0 being the first operation mode, and the read address control unit 213 generates a read address according to the first address order. The RAM circuits 210*a* to 210*h* output the stored data to the outputs 206*a* to 206*h* from the read address generated by the read address control unit 213.

Specifically, in the cycle t16, the RAM circuit 210*a* reads the data 0*b* from the address 0 output to the read address 208*a* by the read address control unit 213.
The RAM circuit 210*b* reads the data 8*b* from the address 1 output to the read address 208*b* by the read address control unit 213.
The RAM circuit 210*c* reads the data 16*b* from the address 2 output to the read address 208*c* by the read address control unit 213.
The RAM circuit 210*d* reads the data 24*b* from the address 3 output to the read address 208*d* by the read address control unit 213.
The RAM circuit 210*e* reads the data 32*b* from the address 4 output to the read address 208*e* by the read address control unit 213.
The RAM circuit 210*f* reads the data 40*b* from the address 5 output to the read address 208*f* by the read address control unit 213.
The RAM circuit 210*g* reads the data 48*b* from the address 6 output to the read address 208*g* by the read address control unit 213.
The RAM circuit 210*h* reads the data 56*b* from the address 7 output to the read address 208*h* by the read address control unit 213.

In the cycle t17, the RAM circuit 210*a* reads the data 57*b* from the address 7 output to the read address 208*a* by the read address control unit 213.
The RAM circuit 210*b* reads the data 1*b* from the address 0 output to the read address 208*b* by the read address control unit 213.
The RAM circuit 210*c* reads the data 9*b* from the address 1 output to the read address 208*c* by the read address control unit 213.
The RAM circuit 210*d* reads the data 17*b* from the address 2 output to the read address 208*d* by the read address control unit 213.
The RAM circuit 210*e* reads the data 25*b* from the address 3 output to the read address 208*e* by the read address control unit 213.
The RAM circuit 210*f* reads the data 33*b* from the address 4 output to the read address 208*f* by the read address control unit 213.
The RAM circuit 210*g* reads the data 41*b* from the address 5 output to the read address 208*g* by the read address control unit 213.
The RAM circuit 210*h* reads the data 49*b* from the address 6 output to the read address 208*h* by the read address control unit 213.

In the cycle t18,
the RAM circuit 210*a* reads the data 50*b* from the address 6 output to the read address 208*a* by the read address control unit 213.
The RAM circuit 210*b* reads the data 58*b* from the address 7 output to the read address 208*b* by the read address control unit 213.
The RAM circuit 210*c* reads the data 2*b* from the address 0 output to the read address 208*c* by the read address control unit 213.
The RAM circuit 210*d* reads the data 10*b* from the address 1 output to the read address 208*d* by the read address control unit 213.
The RAM circuit 210*e* reads the data 18*b* from the address 2 output to the read address 208*e* by the read address control unit 213.
The RAM circuit 210*f* reads the data 26*b* from the address 3 output to the read address 208*f* by the read address control unit 213.
The RAM circuit 210*g* reads the data 34*b* from the address 4 output to the read address 208*g* by the read address control unit 213.
The RAM circuit 210*h* reads the data 42*b* from the address 5 output to the read address 208*h* by the read address control unit 213.

In the cycle t19,
the RAM circuit 210*a* reads the data 43*b* from the address 5 output to the read address 208*a* by the read address control unit 213.
The RAM circuit 210*b* reads the data 51*b* from the address 6 output to the read address 208*b* by the read address control unit 213.
The RAM circuit 210*c* reads the data 59*b* from the address 7 output to the read address 208*c* by the read address control unit 213.
The RAM circuit 210*d* reads the data 3*b* from the address 0 output to the read address 208*d* by the read address control unit 213.
The RAM circuit 210*e* reads the data 11*b* from the address 1 output to the read address 208*e* by the read address control unit 213.
The RAM circuit 210*f* reads the data 19*b* from the address 2 output to the read address 208*f* by the read address control unit 213.
The RAM circuit 210*g* reads the data 27*b* from the address 3 output to the read address 208*g* by the read address control unit 213.
The RAM circuit 210*h* reads the data 35*b* from the address 4 output to the read address 208*h* by the read address control unit 213.

In the cycle t20,
the RAM circuit 210*a* reads the data 36*b* from the address 4 output to the read address 208*a* by the read address control unit 213.
The RAM circuit 210*b* reads the data 44*b* from the address 5 output to the read address 208*b* by the read address control unit 213.
The RAM circuit 210*c* reads the data 52*b* from the address 6 output to the read address 208*c* by the read address control unit 213.
The RAM circuit 210*d* reads the data 60*b* from the address 7 output to the read address 208*d* by the read address control unit 213.
The RAM circuit 210*e* reads the data 4*b* from the address 0 output to the read address 208*e* by the read address control unit 213.

The RAM circuit 210*f* reads the data 12*b* from the address 1 output to the read address 208*f* by the read address control unit 213.

The RAM circuit 210*g* reads the data 20*b* from the address 2 output to the read address 208*g* by the read address control unit 213.

The RAM circuit 210*h* reads the data 28*b* from the address 3 output to the read address 208*h* by the read address control unit 213.

In the cycle t21, the RAM circuit 210*a* reads the data 29*b* from the address 3 output to the read address 208*a* by the read address control unit 213.

The RAM circuit 210*b* reads the data 37*b* from the address 4 output to the read address 208*b* by the read address control unit 213.

The RAM circuit 210*c* reads the data 45*b* from the address 5 output to the read address 208*c* by the read address control unit 213.

The RAM circuit 210*d* reads the data 53*b* from the address 6 output to the read address 208*d* by the read address control unit 213.

The RAM circuit 210*e* reads the data 61*b* from the address 7 output to the read address 208*e* by the read address control unit 213.

The RAM circuit 210*f* reads the data 5*b* from the address 0 output to the read address 208*f* by the read address control unit 213.

The RAM circuit 210*g* reads the data 13*b* from the address 1 output to the read address 208*g* by the read address control unit 213.

The RAM circuit 210*h* reads the data 21*b* from the address 2 output to the read address 208*h* by the read address control unit 213.

In the cycle t22, the RAM circuit 210*a* reads the data 22*b* from the address 2 output to the read address 208*a* by the read address control unit 213.

The RAM circuit 210*b* reads the data 30*b* from the address 3 output to the read address 208*b* by the read address control unit 213.

The RAM circuit 210*c* reads the data 38*b* from the address 4 output to the read address 208*c* by the read address control unit 213.

The RAM circuit 210*d* reads the data 46*b* from the address 5 output to the read address 208*d* by the read address control unit 213.

The RAM circuit 210*e* reads the data 54*b* from the address 6 output to the read address 208*e* by the read address control unit 213.

The RAM circuit 210*f* reads the data 62*b* from the address 7 output to the read address 208*f* by the read address control unit 213.

The RAM circuit 210*g* reads the data 6*b* from the address 0 output to the read address 208*g* by the read address control unit 213.

The RAM circuit 210*h* reads the data 14*b* from the address 1 output to the read address 208*h* by the read address control unit 213.

In the cycle t23, the RAM circuit 210*a* reads the data 15*b* from the address 1 output to the read address 208*a* by the read address control unit 213.

The RAM circuit 210*b* reads the data 23*b* from the address 2 output to the read address 208*b* by the read address control unit 213.

The RAM circuit 210*c* reads the data 31*b* from the address 3 output to the read address 208*c* by the read address control unit 213.

The RAM circuit 210*d* reads the data 39*b* from the address 4 output to the read address 208*d* by the read address control unit 213.

The RAM circuit 210*e* reads the data 47*b* from the address 5 output to the read address 208*e* by the read address control unit 213.

The RAM circuit 210*f* reads the data 55*b* from the address 6 output to the read address 208*f* by the read address control unit 213.

The RAM circuit 210*g* reads the data 63*b* from the address 7 output to the read address 208*g* by the read address control unit 213.

The RAM circuit 210*h* reads the data 7*b* from the address 0 output to the read address 208*h* by the read address control unit 213.

As described above, in the first address order, addresses differing from one another are output to the read addresses 208*a* to 208*h* indicating read addresses of the RAM circuits 210*a* to 210*h*. Moreover, a differing address is output to each of the read addresses 208*a* to 208*h* in each of the cycles of t16 to t23. For example, a differing address of the addresses 0 to 7 is output to the read address 208*a* in each of the cycles of t16 to t23.

Next, an operation of the second data sorting unit 203 in the cycles of t8 to t15 is described.

Specifically, in the cycle t8, the data 0*a* input from 206*a* are output to out0,
the data 8*a* input from 206*b* are output to out1,
the data 16*a* input from 206*c* are output to out2,
the data 24*a* input from 206*d* are output to out3,
the data 32*a* input from 206*e* are output to out4,
the data 40*a* input from 206*f* are output to out5,
the data 48*a* input from 206*g* are output to out6, and
the data 56*a* input from 206*h* are output to out7.

In the cycle t9,
the data 57*a* input from 206*a* are output to out7,
the data 1*a* input from 206*b* are output to out0,
the data 9*a* input from 206*c* are output to out1,
the data 17*a* input from 206*d* are output to out2,
the data 25*a* input from 206*e* are output to out3,
the data 33*a* input from 206*f* are output to out4,
the data 41*a* input from 206*g* are output to out5, and
the data 49*a* input from 206*h* are output to out6.

In the cycle t10,
the data 50*a* input from 206*a* are output to out6,
the data 58*a* input from 206*b* are output to out7,
the data 2*a* input from 206*c* are output to out0,
the data 10*a* input from 206*d* are output to out1,
the data 18*a* input from 206*e* are output to out2,
the data 26*a* input from 206*f* are output to out3,
the data 34*a* input from 206*g* are output to out4, and
the data 42*a* input from 206*h* are output to out5.

In the cycle t11,
the data 43*a* input from 206*a* are output to out5,
the data 51*a* input from 206*b* are output to out6,
the data 59*a* input from 206*c* are output to out7,
the data 3*a* input from 206*d* are output to out0,
the data 11*a* input from 206*e* are output to out1,
the data 19*a* input from 206*f* are output to out2,
the data 27*a* input from 206*g* are output to out3, and
the data 35*a* input from 206*h* are output to out4.

In the cycle t12,
the data 36*a* input from 206*a* are output to out4,
the data 44*a* input from 206*b* are output to out5, the data 52a input from 206c are output to out6,
the data 60a input from 206d are output to out7,
the data 4a input from 206e are output to out0,
the data 12a input from 206f are output to out1,
the data 20a input from 206g are output to out2, and
the data 28a input from 206h are output to out3.
In the cycle t13,
the data 29a input from 206a are output to out3,
the data 37a input from 206b are output to out4,
the data 45a input from 206c are output to out5,
the data 53a input from 206d are output to out6,
the data 61a input from 206e are output to out7,
the data 5a input from 206f are output to out0,
the data 13a input from 206g are output to out1, and
the data 21a input from 206h are output to out2.
In the cycle t14,
the data 22a input from 206a are output to out2,
the data 30a input from 206b are output to out3,
the data 38a input from 206c are output to out4,
the data 46a input from 206d are output to out5,
the data 54a input from 206e are output to out6,
the data 62a input from 206f are output to out7,
the data 6a input from 206g are output to out0, and
the data 14a input from 206h are output to out1.
In the cycle t15,
the data 15a input from 206a are output to out1,
the data 23a input from 206b are output to out2,
the data 31a input from 206c are output to out3,
the data 39a input from 206d are output to out4,
the data 47a input from 206e are output to out5,
the data 55a input from 206f are output to out6,
the data 63a input from 206g are output to out7, and
the data 7a input from 206h are output to out0.

As described above, as a result of sorting processing for data by the second data sorting unit 203, the data 0a to 63a are output to the out0 to out7 in a bit reverse order in the cycles of t8 to t15.

Similarly to the first data sorting unit 202, the second data sorting unit 203 performs rotation processing for 8 pieces of data simultaneously input in parallel and then outputs the processed data, and can be easily achieved by, for example, a shift circuit.

The second data sorting unit 203 performs a similar sorting operation for the data of 0b to 63b in the cycles of t16 to t23 as well, and the data 0b to 63b are output to the out0 to out7 in a bit reverse order.

While the data rearrangement processing has been described above with rearrangement from a sequential order to a bit reverse order as an example, the data rearrangement processing can also be achieved in a similar way regarding rearrangement from a bit reverse order to a sequential order.

As described above, in the present example embodiment, the data rearrangement processing unit 200 included in the FFT device 10 achieves rearrangement from a "sequential order" to a "bit reverse order" or rearrangement from a "bit reverse order" to a "sequential order" that is rearrangement processing of data necessary in a butterfly computation, by controlling a write operation and a read operation of each of the RAM circuits 210a to 210h by the two kinds of first and second address orders. For example, reading is performed in the second address order for data for which writing is performed in the RAM circuit in the first address order, and reading is performed in the first address order for data for which writing is performed in the second address order.

As a result, in the present example embodiment, even when FFT processing of a successively input signal is performed, data rearrangement processing can be achieved by a RAM circuit having a storage capacity equal to the number of points of an FFT. Therefore, since a storage capacity of a RAM circuit can be half as compared to that of a prior art needing a storage capacity at least twice the number of points of an FFT for data rearrangement processing, a circuit scale and consumption power of the RAM circuit can be decreased. As a result, a circuit scale and consumption power of the whole FFT device including a data rearrangement processing unit can be decreased.

Moreover, the above operation can be achieved by executing a program in which a procedure of the operation is previously recorded. The program can be stored by use of various types of non-transitory computer-readable media, and supplied to a computer. The non-transitory computer-readable media include various types of tangible storage media. Examples of the non-transitory computer-readable media include a magnetic recording medium (e.g., a flexible disk, a magnetic tape, and a hard disk drive), a magneto-optical recording medium (e.g., a magneto-optical disk), a CD-read only memory (ROM) a CD-R, a CD-R/W, and a semiconductor memory (e.g., a mask ROM, a programmable ROM (PROM), an erasable PROM (EPROM), a flash ROM, and a random access memory (RAM)). Moreover, the program may be supplied to a computer by various types of transitory computer-readable media. Examples of the transitory computer readable media include an electric signal, an optical signal, and an electromagnetic wave. The transitory computer readable medium can supply a program to a computer via a wired communication path such as an electric wire and an optical fiber, or a wireless communication path.

While the invention of the present application has been described above with reference to the example embodiment, the invention of the present application is not limited by the above description. Various changes that may be understood by a person skilled in the art can be made to a configuration and details according to the invention of the present application within the scope of the invention.

This application is based upon and claims the benefit of priority from Japanese Patent Application No. 2019-058457, filed on Mar. 26, 2019, the disclosure of which is incorporated herein in its entirety by reference.

REFERENCE SIGNS LIST

10 FFT device
11, 12, 13 Data rearrangement processing unit
21, 22 Butterfly computation processing unit
31 Twiddle multiplication processing unit
200 Data rearrangement processing unit
202 First data sorting unit
203 Second data sorting unit
210a to 210h RAM circuit
212 Write address control unit
213 Read address control unit
500 Data flow
501 Data rearrangement processing
502, 503 Butterfly computation processing
504 Twiddle multiplication processing
505a to 505h Partial data flow

What is claimed is:
1. A digital filter device comprising:
a processor; and
memory storing instructions,
wherein the instructions, when executed by the processor, cause the digital filter device to:

write data into storage according to one from among a first address order and a second address order;

perform data rearrangement processing by reading from the storage, according to the second address order, data which was written to the storage according to the first address order, and reading from the storage, according to the first address order, data which was written to the storage according to the second address order, wherein the first address order and the second address order are predetermined, where in the data rearrangement processing comprises first data rearrangement processing and second data rearrangement processing that are successively performed, and wherein the instructions, when executed by the processor, are configured to:
 if, in the first data rearrangement processing, data is read from the storage according to the second address order and data is written to the storage according to the first address order, then, in the second data rearrangement processing, read data from the storage according to the first address order and write data to the storage according to the second address order; and
 if, in the first data rearrangement processing, data is read from the storage according to the first address order and data is written to the storage according to the second address order, then, in the second data rearrangement processing, read data from the storage according to the second address order and write data to the storage according to the first address order.

2. The digital filter device according to claim 1, wherein the storage comprises a plurality of storage circuits,
the first address order always specifies a differing address for each of the plurality of storage circuits, and
the second address order always specifies the same address for each of the plurality of storage circuits.

3. The digital filter device according to claim 1, wherein the instructions, when executed by the processor, cause the digital filter device to:
 perform first butterfly computation processing for data being rearranged in the first data rearrangement processing;
 rearrange data being processed in the first butterfly computation processing using the second data rearrangement processing;
 perform twiddle multiplication for data being rearranged in the second data rearrangement processing;
 second butterfly computation processing for data being processed in the twiddle multiplication processing; and
 perform third data rearrangement processing to rearrange data being processed in the second butterfly computation processing.

4. The digital filter device according to claim 3, wherein the instructions, when executed by the processor, cause the digital filter device to execute, via a processing pipeline:
 the first data rearrangement processing
 the first butterfly computation processing,
 the second data rearrangement processing,
 the twiddle multiplication processing,
 the second butterfly computation processing, and
 the third data rearrangement processing.

5. An operation method for a digital filter device comprising:
 a processor; and
 memory storing instructions,
wherein the instructions, when executed by the processor, cause the digital filter device to:
 write data into storage according to one from among a first address order and a second address order; and
 perform data rearrangement processing by reading from the storage, according to the second address order, data which was written to the storage according to the first address order, and reading from the storage according to the first address order, data which was written to the storage according to the second address order,
wherein the first address order and the second address order are predetermined,
wherein the data rearrangement processing comprises first data rearrangement processing and second data rearrangement processing that are successively performed, and
wherein the instructions, when executed by the processor, are configured to:
 if, in the first data rearrangement processing, data is read from the storage according to the second address order and data is written to the storage according to the first address order, then, in the second data rearrangement processing, read data from the storage according to the first address order and write data to the storage according to the second address order; and
 if, in the first data rearrangement processing, data is read from the storage according to the first address order and data is written to the storage according to the second address order, then, in the second data rearrangement processing, read data from the storage according to the second address order and write data to the storage according to the first address order.

6. A non-transitory computer-readable medium storing a program for operating a digital filter device, which, when executed by a processor, causes the processor to:
 write data into storage according to one from among a first address order and a second address order; and
 perform data rearrangement processing by reading from the storage, according to the second address order, data in which was written to the storage according to the first address order, and reading from the storage, according to the first address order, data in which was written to the storage according to the second address order,
wherein the first address order and the second address order are predetermined,
wherein the data rearrangement processing comprises first data rearrangement processing and second data rearrangement processing that are successively performed, and
wherein the program, when executed by the processor, causes the processor to:
 if, in the first data rearrangement processing, data is read from the storage according to the second address order and data is written to the storage according to the first address order, then, in the second data rearrangement processing, read data from the storage according to the first address order and write data to the storage according to the second address order; and
 if in the first data rearrangement processing, data is read from the storage according to the first address order and data is written to the storage according to the second address order, then, in the second data rearrangement processing, read data from the storage according to the second address order and write data to the storage according to the first address order.

\* \* \* \* \*